(12) United States Patent
Hoehne

(10) Patent No.: US 10,498,049 B2
(45) Date of Patent: Dec. 3, 2019

(54) ASSEMBLY AS A JUNCTION BOX REPLACEMENT AND METHOD FOR INSTALLING SAID ASSEMBLY

(71) Applicant: Q-One Deutschland UG, Achim (DE)

(72) Inventor: Bernd Hoehne, Achim (DE)

(73) Assignee: Q-One Deutschland UG, Achim (DE)

( * ) Notice: Subject to any disclaimer, the term of this patent is extended or adjusted under 35 U.S.C. 154(b) by 0 days.

(21) Appl. No.: 16/093,720

(22) PCT Filed: Mar. 3, 2017

(86) PCT No.: PCT/DE2017/100170
§ 371 (c)(1),
(2) Date: Oct. 15, 2018

(87) PCT Pub. No.: WO2017/182017
PCT Pub. Date: Oct. 26, 2017

(65) Prior Publication Data
US 2019/0074606 A1    Mar. 7, 2019

(30) Foreign Application Priority Data

Apr. 23, 2016  (DE) .................... 20 2016 002 651 U
Jun. 3, 2016  (DE) .................... 20 2016 102 981 U

(51) Int. Cl.
*H01R 4/22* (2006.01)
*H02G 15/007* (2006.01)
(Continued)

(52) U.S. Cl.
CPC .......... *H01R 4/22* (2013.01); *H01R 13/5213* (2013.01); *H01R 13/5804* (2013.01);
(Continued)

(58) Field of Classification Search
CPC combination set(s) only.
See application file for complete search history.

(56) References Cited

U.S. PATENT DOCUMENTS 3,962,554 A  6/1976  Eigel
4,399,602 A  8/1983  Hancock et al.
(Continued)

FOREIGN PATENT DOCUMENTS

AT        4581 U1    8/2001
DE     2129342 C3    2/1975
(Continued)

OTHER PUBLICATIONS

International Search Report dated Jul. 13, 2017, in International Application No. PCT/DE2017/100170.

*Primary Examiner* — William H. Mayo, III
*Assistant Examiner* — Krystal Robinson
(74) *Attorney, Agent, or Firm* — Patent Central LLC; Stephan A. Pendorf

(57) ABSTRACT

An assembly as a junction box replacement, having at least two electrical cables (4). A case (1) encases the ends (40) of the electrical cables (4). Clamping means (2) is arranged so as to extend around at least part of the case (1) and around the electrical cables (4) and is clamped for mutual strain relief. The invention further relates to a method for installing an assembly as a junction box replacement with the following steps: contacting the electrical conductors (41) by means of electrical terminals (42), inserting the ends (40) of the electrical cables (4) into the case (1) through the clamping means (2), which is not yet clamped, and tightening the clamping means (2) and thus mechanically connecting the protective sheaths (43) of the electrical cables (4) to each other and to the case (1).

11 Claims, 5 Drawing Sheets

(51) Int. Cl.
  *H02G 15/18* (2006.01)
  *H02G 3/08* (2006.01)
  *H02G 15/013* (2006.01)
  *H02G 15/115* (2006.01)
  *H01R 13/52* (2006.01)
  *H01R 13/58* (2006.01)

(52) U.S. Cl.
  CPC ......... *H02G 3/088* (2013.01); *H02G 15/007* (2013.01); *H02G 15/013* (2013.01); *H02G 15/115* (2013.01); *H02G 15/18* (2013.01)

(56) References Cited

U.S. PATENT DOCUMENTS

| | | | | |
|---|---|---|---|---|
| 4,735,535 A * | 4/1988 | Baubles | ............... | F16B 37/02 411/188 |
| 5,013,872 A * | 5/1991 | Lockwood | ............... | H01R 4/64 174/663 |
| 5,192,224 A * | 3/1993 | Bernardini | ......... | H01R 13/5808 439/464 |
| 5,216,203 A * | 6/1993 | Gower | ............... | H02G 3/088 174/152 G |
| 6,064,009 A * | 5/2000 | Jorgensen | ............ | H02G 3/0666 174/135 |
| 7,109,423 B1 * | 9/2006 | Bukovnik | ............... | H01R 4/22 174/77 R |
| 7,588,216 B1 * | 9/2009 | Hoyl | ............... | H02G 3/30 174/50 |
| 9,391,388 B1 * | 7/2016 | King, Jr. | ............... | H01R 13/52 |
| 9,831,654 B2 * | 11/2017 | Zantout | ............... | H02G 15/043 |
| 2004/0104039 A1 * | 6/2004 | Herbert King, Jr. | .... | H01R 4/12 174/87 |

FOREIGN PATENT DOCUMENTS

| | | |
|---|---|---|
| DE | 19742809 C1 | 12/1998 |
| FR | 2815777 A1 | 4/2002 |
| FR | 2877778 A1 | 5/2006 |
| JP | 2000092684 A | 3/2000 |
| JP | 2001266965 A | 9/2001 |
| JP | 2013192432 A | 9/2013 |
| WO | 2010084343 A2 | 7/2010 |
| WO | 2012163877 A1 | 12/2012 |

* cited by examiner

Fig. 1b
Fig. 1c
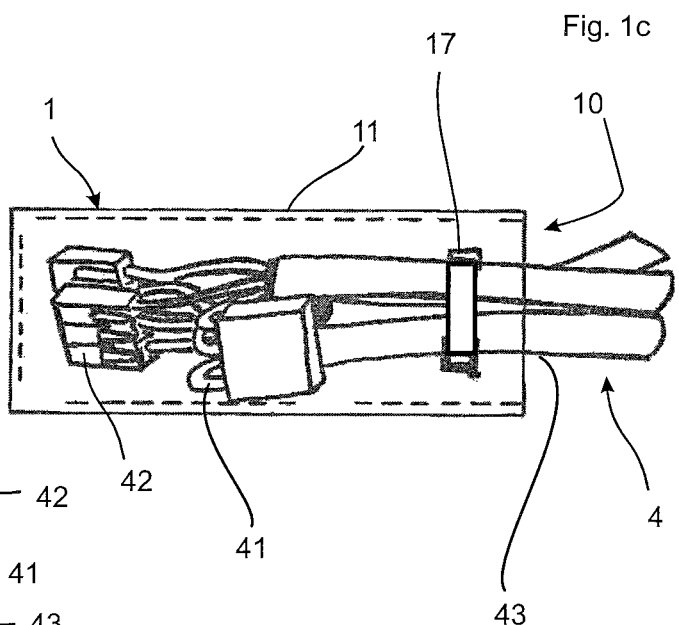
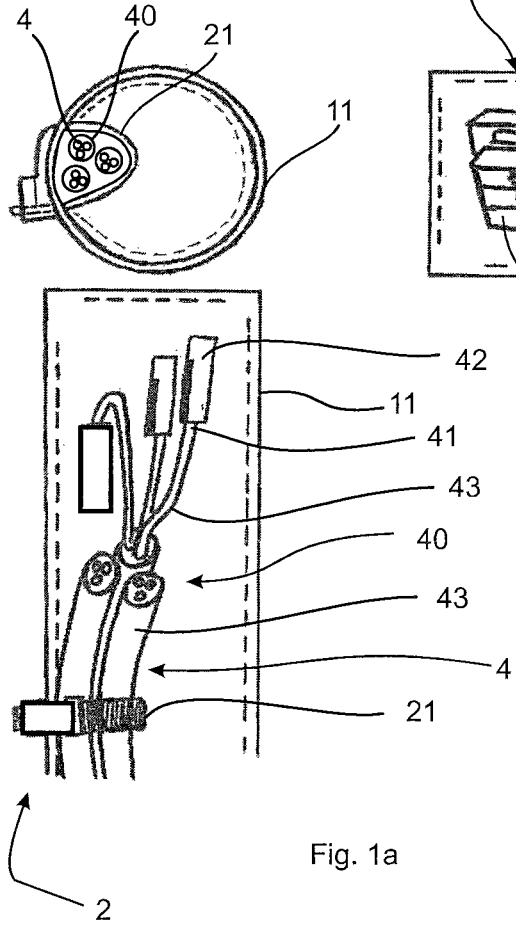
Fig. 1a

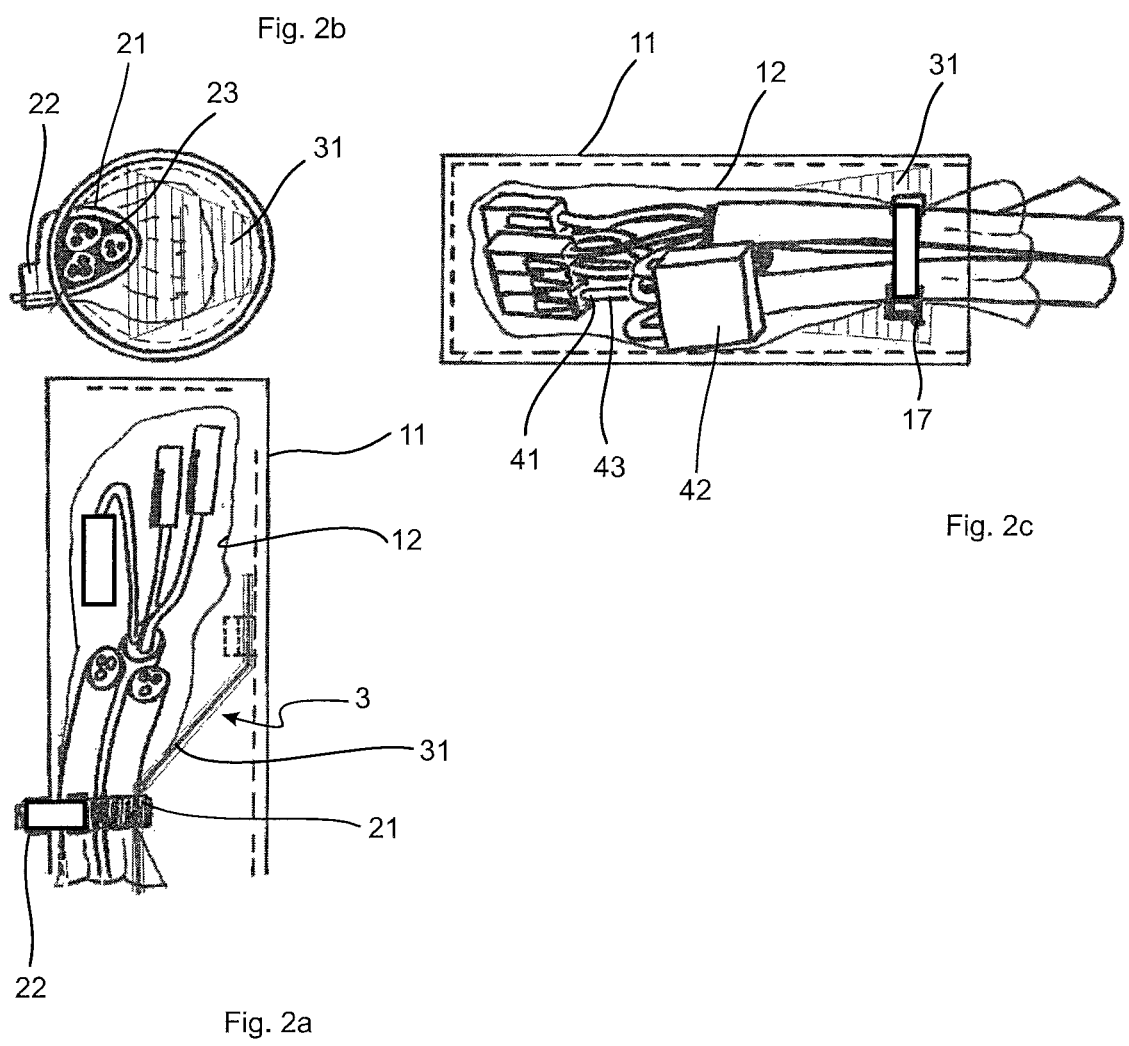

Fig. 3b
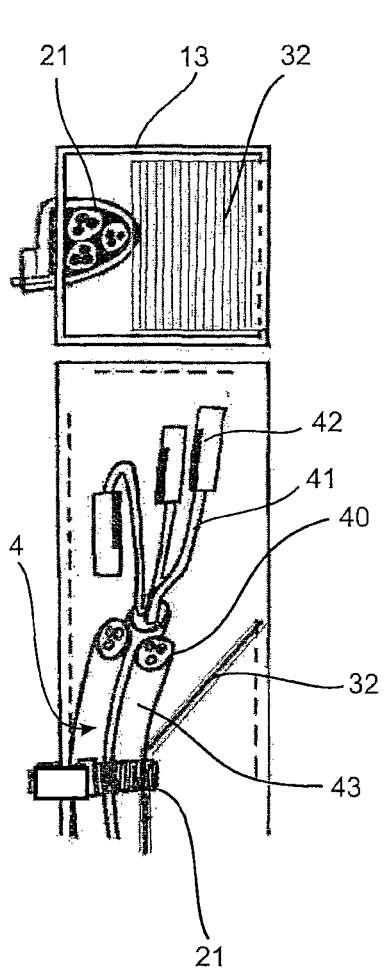
Fig. 3a
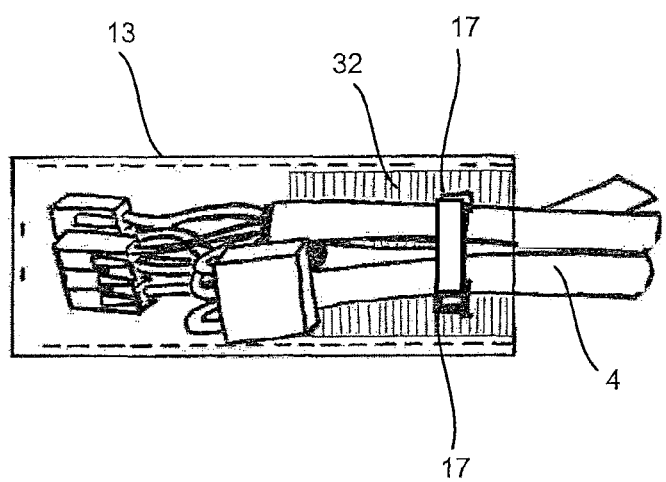
Fig. 3c
Fig. 3d

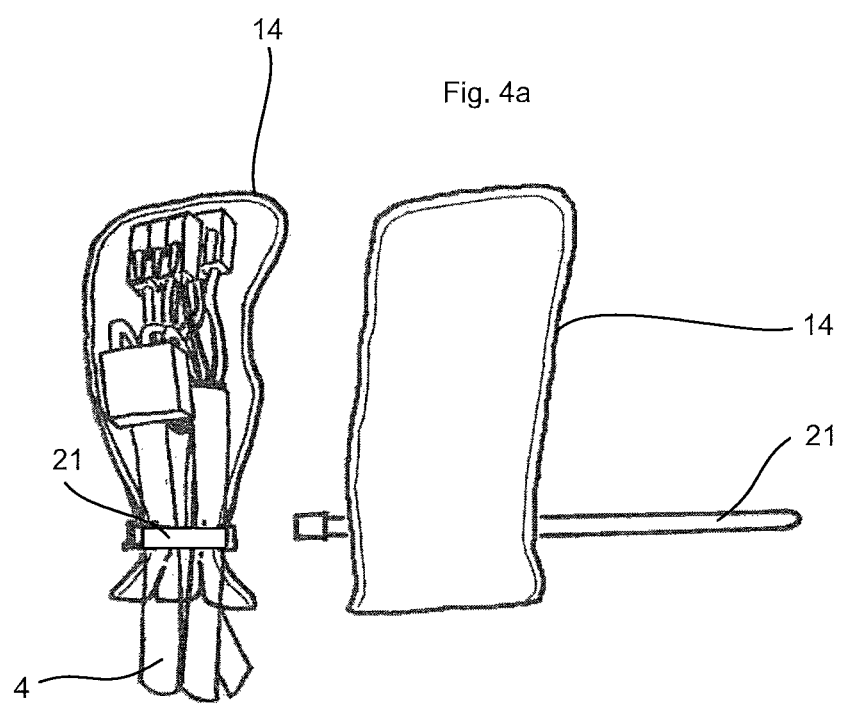

Fig. 5a
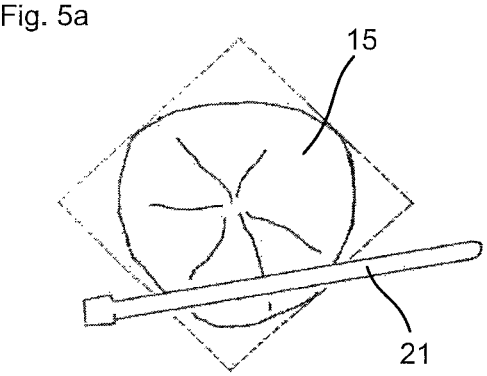
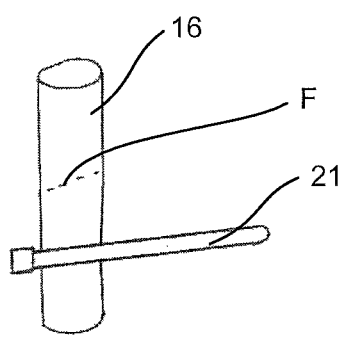
Fig. 6a
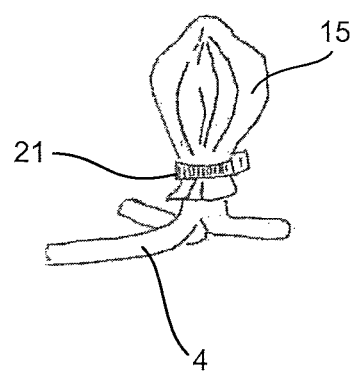
Fig. 5b
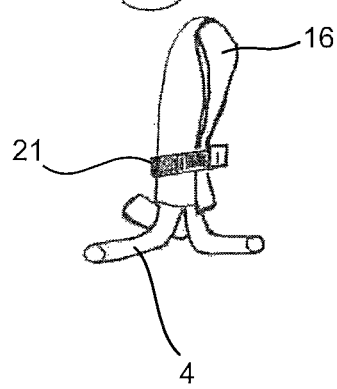
Fig. 6b

ASSEMBLY AS A JUNCTION BOX REPLACEMENT AND METHOD FOR INSTALLING SAID ASSEMBLY

BACKGROUND OF THE INVENTION

Field of the Invention

The invention relates to an assembly as a junction box replacement, with at least two electrical cables which end at the assembly and are provided with a protective sheath and have individual electrical conductors provided with insulation. Furthermore, the invention relates to a method for installing this assembly.

Description of the Related Art

When it comes to the interior design of buildings, suspended ceilings, double floors and drywall walls are being used more and more frequently in order to ensure greater flexibility in reshaping the spaces. This changes the requirements for the electrical installation laid there. Installation material is conventionally designed for solid masonry and is differentiated based on intended used into flush-mounting (UP) and surface-mounting (AP). In both classic types of installation, electrical cables are predominantly solidly fixed. In the case of more flexible interior fittings, however, the laying of electrical cables in suspended ceilings, raised floors and drywall walls is mostly loose.

In particular junction boxes do not meet the needs of flexible hollow space installations with loosely laid electrical cables.

Junction boxes are known for use on plaster with and without splash protection which often find use in loose installations in hollow spaces. Such junction boxes do not have adequate strain relief. Their design is more suitable for branching rigidly routed lines. Their use in false floors and false ceilings is inefficient and takes a long time to be clamped unattached, since for each cable insertion a hole is punched with force into the can before each cable is then inserted into a designated hole in the can and clamped. In addition, the narrowness of the can hinders the clamping, depending on the number of branches, which takes considerable time before the can is finally closed with a separate lid.

On the one hand, the well-known surface-mounted junction boxes, which are often used in cavities, often have a spray-water protection which would be unnecessary in dry rooms, but on the other hand there is a lack of adequate strain relief, which prevents wires from being loosened by pulling, especially during later work on the installation, so that failed connections arise on terminal contacts that can pose a fire hazard. The handling of the known junction boxes is cumbersome and time consuming in such loose installations. For efficient handling, the can would first have to be fastened, negating the benefits of loose cabling.

DE 21 29 342 C3 describes a capsule device for receiving spliced connected electrical conductors with a liquid-tight enclosure, in which a deposit of thick-walled porous open-cell material is arranged and with a splice enclosing flowable insulating material mass penetrating into the porous material, wherein the insulating material mass consists of a material of permanent gel-like consistency. In order for this elastic case to not leak with the filled insulating material mass, a sealing strip is provided which ensures unintentional opening of an openable seam. This device provides no strain relief.

From WO 2012/163877 A1 an end cap for connecting stripped cable ends is known in which all cable ends are connected together in a single contact. From this document, a two-part housing is known, in which a clamping unit can be inserted, in which two clamping means are provided, which on the one hand fix the insulated cables to each other and on the other hand press the stripped cable ends for contacting each other. With this device, however, only a single contact can be made, whereas a plurality of individual contacts according to a common contact junction box is not described.

From JP 2013-192432 A a junction box for multiple cables with contact connectors is known, which are accommodated protected in a box through a plug-in opening, the opening is equipped with a flap/case against unauthorized access with a barrier against re-opening. In that regard, an access protection is realized, whereas with this flap/case no strain relief for the electrical cable introduced into the junction box is possible.

JP 2000-92 684 A describes an insulating cap, which is slipped over a cable threading and anchored with the cable via a clamping means. The clamping means thus serves to fix the insulating cap on the cable end, but not the strain relief. It is not suitable for multiple cable connections as required for a junction box.

The object of the invention is to provide an assembly for branching of electric wires as a junction box, which in particular meets the requirements of flexible loose installations in suspended ceilings, raised floors and inside walls, and is easier and more efficient to handle and also ensures strain relief.

This object is achieved with an assembly as a junction box replacement, with at least two electrical cables which end at the assembly and are provided with a protective sheath and have individual electrical conductors provided with insulation, with an anchoring of all inserted electrical cables together with the case. The electrical cables thus provide each other with a strain relief, which is ensured by the stiff and durable protective sheath of the electrical cable. Furthermore, the invention relates to a method for installing this assembly.

BRIEF SUMMARY OF THE INVENTION

Therein, in that a case and a clamping means are provided, wherein the case covers the ends of the electrical cable, overlapping the protective sheath, and the clamping means is arranged so as to extend around at least part of the case and around the electrical cables with their protective sheath and is clamped for mutual strain relief, the cable is securely connected to the case, and further, the ends of the electrical conductor are securely received in the case, so that a person may suffer no unwanted touching of possible open electrical conductors. The clamping means brings about for the two or more electrical cables, of which the electrical conductors are contacted with each other, for example, via electrical terminals, an anchoring of all inserted electrical cable together with the case. The electrical cables thus provide each other with a strain relief, which is ensured by the stiff and durable protective sheath of the electrical cable. Such electrical cables are for example plastic sheathed cables with the abbreviation NYM(-J) or underground cables with the abbreviation NYY(-J). Therewith the region of the electrical cable extending into the case is decoupled from any tensile loads. A loosening of individual electrical conductors in electrical terminals with the risk of loose contacts and fire hazard is avoided.

When the case is formed of an electrically nonconductive and tear resistant material, a secure electrical insulation of the electrical conductors received in the case with respect to the environment is achieved. Even with mechanical stress of the case during construction or restoration activities, a damaging of the case and thus the electrical insulation is unlikely.

Thereby, that the sheath is formed of a flat, bag-shaped or tubular elastic material, wherein the bag-shaped or tubular material has an opening through which the ends of the electrical cable can be inserted, easy handling when creating the assembly as a junction box replacement is guaranteed. A flat material, for example having a square, rectangular or circular shape can be wrapped around the open end of the electrical cable, enclosing this completely, wherein then the clamping means then clamps the thus created case and the electrical cables with each other. In the case of a bag-shaped material, the corresponding cable ends with their previously contacted clamp equipped cable ends are pushed so far into the bag designed as a case, so then the case and the electrical cable can be clamped together by means of the clamping means. In the case of a tubular material, this is pulled over the electrical cable and the ends of the electrical conductors, with a sufficient portion of the tube provided to fold over such that the clamping means can clamp both the ends of the folded hose section and the introduced electrical cable ends with each other.

If the elastic material is waterproof, then a spray water protection (for example, IP 44 or IP 54) can be ensured for the assembly as a junction box replacement with relatively simple means.

If the case is formed of a solid material in a space form with an opening through which the ends of the electrical cables can be inserted, a mechanically stiffened space is provided for the electrical cable ends to be inserted with any cable clamps, protected from mechanical external stresses by the solid case. The electrical cable ends can be inserted through the opening. As spatial forms, a cylindrical shape, quadratic shape or the like are conceivable.

If the envelope of solid material is formed of elastic material in the region of the opening, wherein the elastic material is integrally formed on the otherwise solid material case, in this combination of materials both a mechanically strong structure for the cable ends inserted into the case, as well as also an elastic closure of the opening, securing against unintended contact as well as protecting from splashing, is achieved by contracting the elastic material in the region of the clamping means.

If the case has a permanent elastic sealing means in the area of clamping means, the (splash-) water protection can be further improved. If necessary, the assembly withstands a brief immersion in water according to IP 57.

Thereby, that the case is completely filled with a permanently elastic sealant after the assembly with the electrical cables and the clamping with the clamping means, an improved moisture protection, possibly even waterproofness can be achieved. As sealing material there are suitable in particular permanently elastic materials, such as silicone or closed cellular foam materials. According to the method, this is achieved in that the case is completely filled with a permanently elastic sealant after being fitted with the electrical cables and the clamping with the clamping means.

In a further embodiment, the case is formed in two parts, wherein an inner case of elastic material and an outer case in a solid spatial form are provided. Thus, the outer case can ensure protection against mechanical stress and provide sufficient space for not too tight insertion of electrical cables to be contacted with each other, wherein an inner case of elastic material, which is also clamped with the clamping means together with the cables, on the one hand prevents an unintended access in the opening of the space-defining solid case and on the other hand represents a spray water protection.

If an access protection is provided in the spatial form near the opening, extending over the opening, safety against electrical shock is further increased.

Thereby, that the engagement protection is fixed on one side to the case in the spatial form and at its other end is encompassed and fixed by the clamping means, the access protection is fixed along when clamping the inserted electrical cable ends to the assembly. According to the method, this is solved in that the opening in the case is closed with an access protection, in that the access protection is clamped together with the electrical cables via the clamping means.

The clamping means is preferably a cable tie, a tension clamp or a screw clamp.

If the clamping means is attached to the case or inserted through the case, the clamping is always kept in the right place and can be clamped immediately after insertion of the electrical cable ends.

To function as a junction box, the electrical cable(s) are attached to electrical terminals at the end of the electrical conductors. Accordingly, such an assembly is installed with the steps contacting the electrical conductors by means of electrical terminals, inserting the ends of the electrical cables into the envelope through the still not clamped clamping means and tightening of the clamping means and thereby mechanically connecting the protective sheaths of the electrical cables with each other and with the case.

BRIEF DESCRIPTION OF THE SEVERAL VIEWS OF THE DRAWINGS

Hereinafter, various embodiments of the invention will be described in detail with reference to the accompanying drawings.

There is shown in:

FIG. 1a, b, c an assembly as a junction box replacement in three partly sectional views in a first embodiment FIG. 2a, b, c an assembly as a junction box replacement in a second embodiment, FIG. 3a, b, c, d an assembly as a junction box replacement in a third embodiment, FIG. 4a, b an assembly as a junction box replacement in a fourth embodiment, FIG. 5a, b an assembly as a junction box replacement or the case with clamping means in a fifth embodiment and FIG. 6a, b an assembly as a junction box replacement or the case with clamping means in a sixth embodiment.

DETAILED DESCRIPTION OF THE INVENTION

In FIG. 1, an assembly is shown as a junction box replacement in three partially sectional views in a first embodiment. The assembly comprises a case 1 made of a solid, electrically non-conductive material in a cylindrical shape. In FIG. 1a a side view of a first side, in FIG. 1b a partially sectioned plan view of the cylindrical case 11 is shown. FIG. 1c shows a side view, as FIG. 1a only rotated in orientation by 90°.

The cylindrical, solid case 11 has a solid spatial form, wherein the cylindrical case 11 is closed at one end face and thus on the other end side has an opening 10 through which electrical cables 4 can be inserted.

In the first embodiment shown in FIG. 1 three electrical cables 4 with standard protective sheath 43, for example of the type N YM, are shown. The in the electrical cables 4, electrical conductors 41, individually provided with insulation 44, are inserted according to the desired assignment in electrical terminals 42 for contacting. In FIG. 1c, this situation is fully illustrated, wherein it is made for clarity in FIG. 1a only for the electrical cables of the three cables shown there.

In the cylindrical case 11, two through openings 17 are arranged adjacent the opening 10 in the cylindrical body of the sheath, through which a clamping means 2 in the form of a cable tie 21 is inserted, wherein a cable tie head 22 (see FIG. 2a) is to be arranged outside the cylindrical case, so that the electrical cable ends 40 inserted in the cylindrical case 11 through the opening 10 can be clamped with the cable tie 21 to each other and tensioned on the cylindrical case 11 from the outside. The corresponding installation situation can be seen in FIG. 1b.

In a second embodiment according to FIGS. 2a, b and c, a corresponding assembly is shown again with a cylindrical solid case 11 as in views in FIG. 1. In the cylindrical case 11, however, an inner, elastic case 12, similar to a plastic bag is additionally provided. Further, an access protection 3 is provided in the faun of an inner flap 31 in the inside of the cylindrical, solid case 11.

The cable tie 21 provided as a clamping means 2 wraps around the inner, elastic sheath 12 and the inner flap 31 provided as an access protection 3 near the opening 10 within the cylindrical, solid case 11, the cable tie 21 being opened to the extent that the cable tie 21 is not yet equipped that this circumferentially substantially rests against the inner wall of the cylindrical case 11 and thus the inner flap 31 also bears against the wall of the cylindrical case 11 and the inner, elastic case 12 is also wide open.

The electrical cable ends 40 are, with their electrical conductor 41 end portions stripped of the insulation, contacted with each other in electrical terminals 42 in the required manner and are then inserted in the case 1 consisting of the cylindrical, solid case 11 as outer case having a solid spatial form and the inner elastic case 12.

In the region of the to be tensioned cable tie 21, a permanently elastic sealing means 23 is provided in the opening 10 within the inner case 12, so that after clamping the cable tie 21, the inner case 12 presses around the looped-in electrical cable 4 and by means of the permanently elastic sealing means 23 provides a water tight seal, so that this junction box substitute can even be submersed (short term) in water (IP 57).

FIG. 3a to d show an assembly as a junction box replacement in a third embodiment, in which the case 1 is designed as a quadratic, solid case 13. The quadratic case 13 here has an elongated shape, with one small end face closed and the other small end face open, namely forming the opening 10. Of course, the quadratic case 13 also have cube shape or broader transverse extent. Near the opening 10 two insertion openings 17 are arranged, through which a cable tie 21 is inserted as clamping means 2. The side opposite the side surface with the insertion openings 17 has, as an access protection 3, a foldable flap 32 as part of this side wall. Second insertion openings 33 are provided through this fold-down tab 32 through which the cable tie 21 is also inserted.

In the unequipped basic state the cable tie 21 is wide open, so that the cable tie 21 is largely applied to the inside of the quadratic case 13 and the fold-down tab 32 is wide open and thus the largest possible opening 10 is formed.

After plugging of the finished contacted electrical cable ends 4 through this opening 10 and thus through the cable tie 21, the cable tie 21 is tightened at the cable tie head 22 from the outside, so that the down foldable flap 32 folds down onto the enveloped electrical cable 4 and the electrical cable 4 with their protective sheaths 43 are tensioned together with each other and with the quadratic case 13.

In FIGS. 4a and b show a fourth embodiment of the invention, namely an assembly consisting solely of an elastic case 1, here a bag-like, elastic case 14 with the electrical cables 4 received therein. At the bag-like case 14, which likewise has an opening 10 for receiving the cable ends 40, as clamping means 2 a cable tie 21 is attached, for example, glued, on the outside.

In FIG. 4a, the bag-shaped case 14 is shown in the open state with the clamping means 2 attached thereto in the form of a cable tie 21 also in the open state. In this open state, the opening 10 of the bag-shaped case 10 is wide open, so that electrical cables 4 pre-contacted with electrical terminals 42 can be inserted through the opening 10 in the bag-shaped case 14. The electrical cables 4 are inserted so far, that the cable tie 21 engages with its clamping action on the outer protective sheath 43 of the electrical cable 4. Now, the cable tie is wrapped around the bag-shaped casing 14 enclosing the electrical cable ends 40 and clamped as shown in FIG. 4b.

In FIGS. 5a and b, a fifth embodiment of the invention is shown as a junction box replacement with a flat, elastic case 15. The planar envelope, shown in circular shape, has fixed on its outside near an edge area a cable tie 21.

If there is now an assembled bundle of electrical cables 4 connected to electric terminals 42, the end thereof is placed in the center of the flat case 15 and folded down on all sides. In the area of the protective sheath 43 of the electric wire 4 then the cable tie 21, covering over the flat case 15 at its entire periphery, is looped around the electrical cables 4, tensioning these to each other. This situation is shown in FIG. 5b.

In FIGS. 6a and 6b, a sixth embodiment of an assembly is shown as a junction box replacement with a tubular, elastic case 16.

In FIG. 6a, the bare tube-shaped case 16 is shown with a cable tie 21 attached to the outside. The tubular, elastic sheath 16 has 2 openings, wherein only one opening 10 serves as an insertion opening for the prefabricated electrical cables 4. These cables 4 are inserted up to half-way at most in the tubular case 16 and then the tubular case 16 is folded back along the fold line F (dashed line) and the cable tie is clamped around the tubular sheath 16, namely with both ends and the cable ends 40 received therein, as shown in FIG. 6b.

With the assembly according to the invention as a junction box replacement, electrical cables 4 can be cut to length comfortably and time-saving freely accessible by the electrician, their conductor 41 stripped, and be contacted with cable clamps 42 and then wrapped before the final installation in the interior of buildings with the appropriate case 1 and tensioned with clamp means 2, so that a strain relief is done so that when using individual electrical cables 4 these transfer over the clamping means 2 the induced forces on the other electrical cables 4, but not on the contacted electrical conductors 41 arranged in the terminals 42 behind the clamping means 2. It is thus safely avoided that loose contacts and thus fire hazard could arise. Furthermore, a later access to these "replacement junction boxes" may be had at any time in time saving manner by the removal and subsequent resealing of the case 1 enclosing the cable ends 40.

Further, by correspondingly elastic and waterproof sheaths 1, it is easily possible to realize a splash protection. With a suitable choice of additional sealants, such as permanently elastic sealants 23 in the area of the clamping means 2 inside the closeable opening 10 even higher quality water protection can be achieved.

All embodiments of the inventive idea have in common that all electrical cables 4, which are contacted with each other or at least are to be secured at this point, are enveloped by a case 1 and are fixed to each by a suitable clamping means 2 to transfer any occurring tensile forces onto the stable protective sheath 43 of the electrical cable 4.

LIST OF REFERENCE NUMBERS

1 case
10 opening
11 cylindrical, solid case
12 inner, elastic case
13 quadratic, solid case
14 bag-shaped, elastic case
15 flat, elastic case
16 tubular, elastic case
17 insertion opening
2 clamping means
21 cable ties
22 cable tie head
23 permanent elastic sealant
3 engagement protection
31 inside flap
32 fold-down flap
33 second insertion opening
4 electrical cable
40 electrical cable end
41 conductor
42 electrical terminal
43 protective sheath
44 insulation
F fold line

The invention claimed is:

1. An assembly as a junction box replacement comprising at least two electrical cables (4) which end in the assembly and are provided with a protective sheath (43) and have individual electrical conductors (41) provided with insulation (44),
   wherein a case (1) made of a spatially rigid material with an opening (10), through which the ends (40) the electrical cable (4) are inserted, and a clamping means (2) are provided,
   wherein the case (1) encases the ends (40) of the electrical cables (4) with overlapping of the protective sheath (43), and the clamping means (2) is arranged encircling at least a part of the case (1) and the electrical cables (4) with the protective sheath (43) and tensioned for mutual strain relief, and
   wherein the case (1) of solid material is formed in the area of the opening (10) of elastic material, wherein the elastic material is molded on the case (1) otherwise made of solid material.

2. The assembly according to claim 1, wherein the case (1) is formed of an electrically non-conductive and tear-resistant material.

3. The assembly according to claim 1, wherein the case (1) in the area of the clamping means (2) is provided with a permanently elastic sealant (23).

4. The assembly according to claim 1, wherein the spatial form is provided near the opening (10) with an access protection (3) extending over the opening (10), wherein the access protection (3) on one end is fixed on the case (1) in the spatial form and at the other end is securely encompassed by the damping means (2).

5. The assembly according to claim 1, wherein the clamping means (2) is a cable tie (21), a tension clamp or a screw clamp.

6. The assembly according to claim 1, wherein the clamping means (2) is attached to the case (1) or inserted through the case (1).

7. The assembly according to claim 1, wherein the electrical conductors (41) of the electrical cables (4) are attached with their stripped ends in electrical terminals (42).

8. A method for installing a system as a junction box replacement according to claim 1, comprising the steps:
   contacting the electrical conductors (41) by means of electrical terminals (42),
   inserting the ends (40) the electrical cables (4) into the case (1) through the not yet tensioned clamping means (2), and
   tightening the clamping means (2) and thus mechanically connecting the protective sheaths (43) of the electrical cables (4) with each other and with the case (1).

9. The method according to claim 8, further comprising closing the opening (10) on the case (1) by an access protection (3), whereby the access protection (3) along with the electrical cables (4) are tensioned with the clamping means (2).

10. The method according to claim 8, wherein the case (1), after being provided with the electrical cables (4) and clamped with the clamping means (2), is completely filled with a permanently elastic sealant.

11. An assembly as a junction box replacement comprising at least two electrical cables (4) which end in the assembly and are provided with a protective sheath (43) and have individual electrical conductors (41) provided with insulation (44), wherein a case (1) and a clamping means (2) are provided, wherein the case (1) encases the ends (40) of the electrical cables (4) with overlapping of the protective sheath (43), and the clamping means (2) is arranged encircling at least a part of the case (1) and the electrical cables (4) with the protective sheath (43) and tensioned for mutual strain relief, wherein the case (1) is formed in two parts, wherein an inner case (12) is made of elastic material and an outer case (1) has a rigid spatial form.

* * * * *